(12) United States Patent
Zander et al.

(10) Patent No.: US 6,360,218 B1
(45) Date of Patent: Mar. 19, 2002

(54) COMPACT RECORD FORMAT FOR LOW-OVERHEAD DATABASES

(75) Inventors: Jason L. Zander, Redmond; William G. Evans; Brian D. Harry, both of Woodinville, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/178,810

(22) Filed: Oct. 26, 1998

(51) Int. Cl.[7] ............................................... G06F 17/30
(52) U.S. Cl. ............................. 707/7; 707/1; 707/102; 707/200
(58) Field of Search ............................ 707/200, 201, 707/205, 102, 101, 4, 104; 717/7, 1; 709/5, 217, 250, 239; 705/34, 40; 714/798; 712/43

(56) References Cited

U.S. PATENT DOCUMENTS

| | | | | |
|---|---|---|---|---|
| 5,561,793 A | * | 10/1996 | Bennett et al. | 707/205 |
| 5,611,076 A | * | 3/1997 | Durlinger et al. | 707/102 |
| 5,713,014 A | * | 1/1998 | Durflinger et al. | 707/4 |
| 5,742,806 A | * | 4/1998 | Reiner et al. | 707/1 |
| 5,835,912 A | * | 11/1998 | Pet | 707/104.1 |
| 5,991,776 A | * | 11/1999 | Bennett et al. | 707/205 |
| 6,073,129 A | * | 6/2000 | Levine et al. | 707/4 |
| 5,960,200 A | * | 9/2000 | Eager et al. | 717/7 |

* cited by examiner

*Primary Examiner*—Diane D. Mizrahi
(74) *Attorney, Agent, or Firm*—Amin & Turocy, LLP

(57) ABSTRACT

The present invention relates to a table format for representing column data for a relational database in a data file. The table format includes a plurality of records of fixed size. The table format also includes a plurality of columns in each record for holding the column data values, the table being rewritten after changes to its data values. Each record can contain a further non-data column indicating the sequence of the record in the table. Additionally, the size of each column is no larger than necessary to hold the largest column data value in all of the records. At least one of the columns can be designated a primary key—the records being arranged in order of the data values of their primary key columns.

12 Claims, 5 Drawing Sheets

COMPACT RECORD FORMAT FOR LOW-OVERHEAD DATABASES

COPYRIGHT DISCLAIMER

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention pertains to electronic data processing, and more particularly concerns reducing the overhead associated with small databases, especially for computers having limited capacity.

Conventional relational databases such as Microsoft® Access® and SQL Server are flexible and powerful. However, they are large programs, and they are optimized for large databases, concurrent access by multiple users, and ease of modifying data.

One of the consequences of this optimization is that the performance overhead of each database is relatively high. In particular, conventional databases must store a schema that is developed anew by the database program for each database. A relational database is made up of one or (usually) more tables. Each table is a set of records or rows having data in a defined set of columns. The data in each column is defined to be of a certain type, and may also have value restrictions, such as uniqueness or not null. Indexes can be defined on certain table columns. This information about the database is its schema. Database programs employ a data definition language whereby a user can define and modify the schema of a database. Because the data definition language (DDL) is typically the only facility for manipulating the schema of a database, a user (or, more likely, a database administrator) must create every new database essentially by hand. Again, for large databases having multiple users, this is not a problem.

Another consequence is that the storage overhead of each database is high. Optimization for concurrent usage, especially concurrent updating, by many users imposes many restrictions upon the form of the data. Constant read and write operations make many compression techniques too time-consuming. Large numbers of write operations relative to read operations impose restrictions on reorganizing the data for storage efficiency.

An increasing range of applications, however, could advantageously employ the power of the relational model for a large number of smaller databases, especially those normally accessed only by single users who mostly read the data, and write new data infrequently. For example, component libraries containing class and type definitions for programming systems need to be widely distributed, and seldom have their data modified. As another example, address books in hand-held personal computers and similar applications are the antithesis of the databases for which relational databases are designed. These applications have many copies of similarly defined small, single-user, read-mostly databases.

Today, many such applications employ one-off database programs of very limited power and flexibility in order to allow the use of compression and other techniques for increasing efficiency. Consequently, there is a need for processing large numbers of relatively small data bases without incurring the storage penalties of conventional relational database management systems or the limitations of individually written database programs.

SUMMARY OF THE INVENTION

The present invention provides a data file format optimized for small, single-user, read-mostly databases. The file has a signature, a number of data streams, and a header identifying the data streams. Compressed relational tables are represented as fixed-width arrays. The invention also provides a table format having a fixed width for easy access to individual records. Any table having a designated primary key has its records ordered by the values of the primary key, so that a simple binary search can find any desired value. An additional non-persisted record number column may identify each record. Another non-data hash column can optionally facilitate hash chaining by containing the number of the next record in each hash chain, so that a hash vector need only contain the record number of the first record in each hash chain.

DETAILED DESCRIPTION OF THE INVENTION

The following detailed description refers to the accompanying drawings that form a part hereof, and shows by way of illustration specific embodiments of the present invention. These embodiments are described in sufficient detail to enable those skilled in the art to practice the invention. Structural, logical, and procedural modifications within the spirit and scope of the invention will occur to those skilled in the art. The following description is therefore not to be taken in a limiting sense, and the scope of the inventions is defined only by the appended claims. The description includes only a portion of the system in which the present invention operates. A more complete description can be found in copending commonly assigned application Ser. No. 09/178,907, filed Oct. 26, 1998, which is hereby incorporated by reference.

Figure 1:
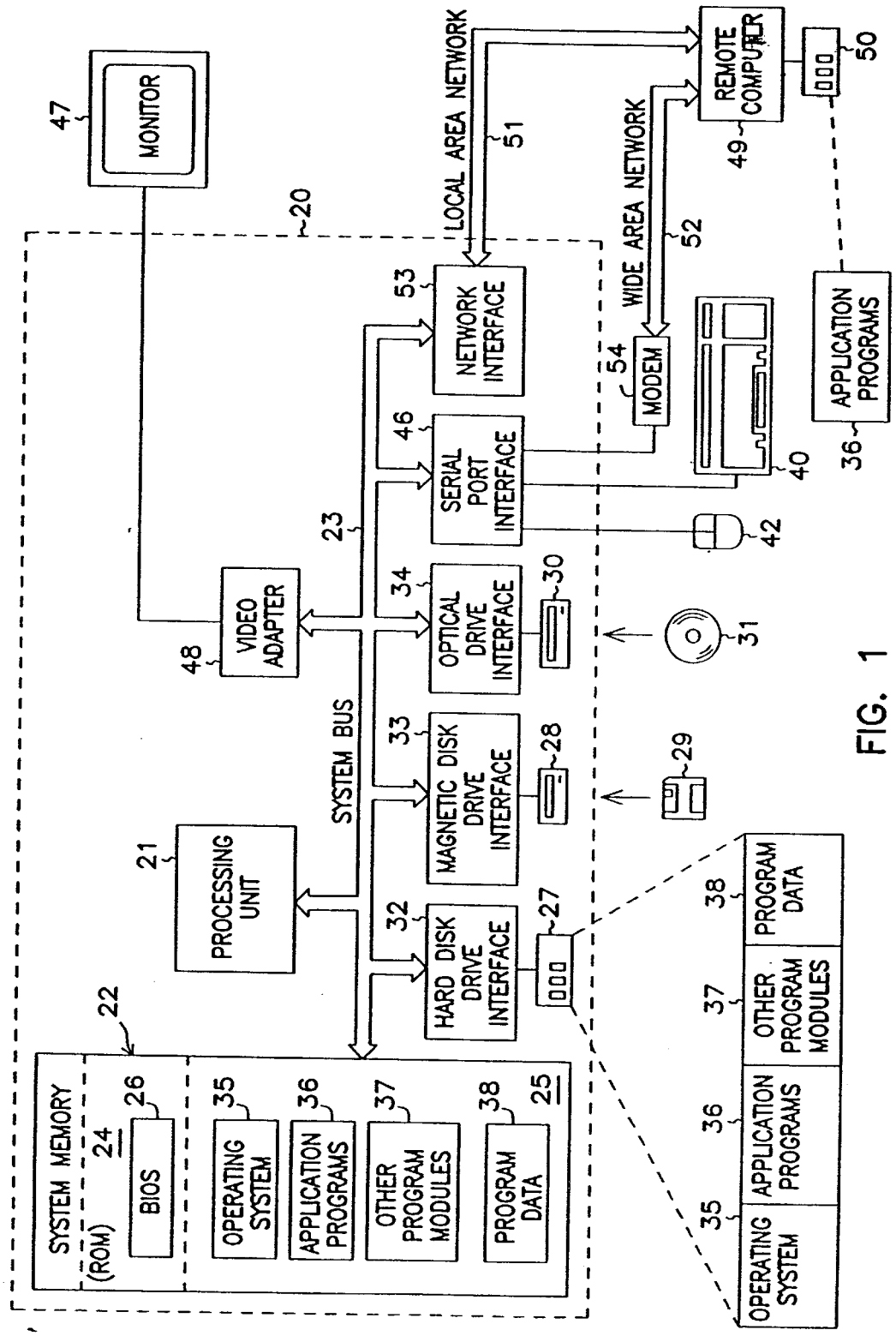
FIG. 1 is a block diagram of an environment for carrying out the invention.

FIG. 1 shows a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those in the art will appreciate that the invention may be practiced with other computer-system configurations, including hand-held devices, multi-processor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

The environment of FIG. 1 employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Figure 2:
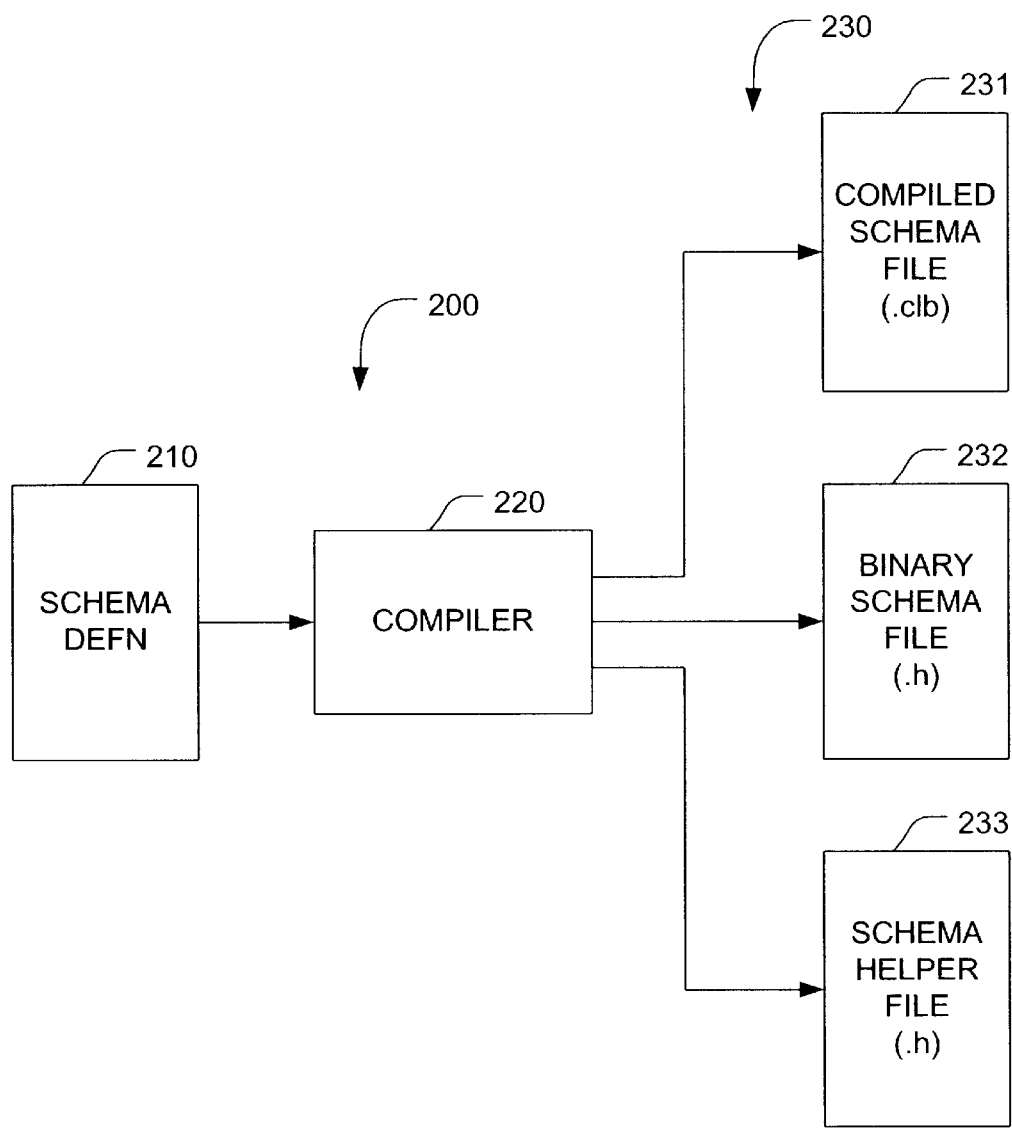
FIG. 2 is a diagram of data and program components for creating schema representations.

FIG. 2 describes data and program components 200 for generating schema representations that can be stored and accessed externally to a relational database. This description uses the continuing example of a simple database for employee information.

Script file 210 is a human-readable file by which a designer defines the schema of a relational database. A conventional SQL database system would define a schema having three tables of employee information and two indices with DDL statements such as the following:

create table Employee (empid int pk, FirstName varchar (64), LastName varchar (64), dateofbirth DATETIME);
    create table Emp401k (empid int, AcctID int, Deduction currency);
    create unique hash index Emp401kIDs on Emp401K (empid, AcctID);
    create table EmpReview (empid int, ReviewDate DATETIME, Score short);
    create unique hash index ReviewDex on EmpReview (empid, ReviewDate);

File 210 employs a similar format:

declare schema Emp401k, 1, {0E8C9097-650B-11d1-B748-00C04FC32480};
    create table Employee (empid int pk, FirstName varchar (64), LastName varchar (64), dateofbirth DATETIME);
    create table Emp401k (empid int, AcctID int, Deduction currency);
    create unique hash index Emp401kIDs on Emp401K (empid, AcctID);
    create table EmpReview (empid int, ReviewDate DATETIME, Score short);
    create unique hash index ReviewDex on EmpReview (empid, ReviewDate);

The first line of file 210 declares the schema definition. The subsequent lines define the tables, the columns of each table, and the data type of each column in a conventional manner.

declare schema <Name>, <version>, <sid>;

declares a schema by specifying a mnemonic name, a version number, and a schema identifier, which is a conventional 16-byte globally unique identifier (GUID). The above statement is the only new syntax required by the invention; the remainder closely follows standard ANSI SQL syntax.

create table <Name>
    (
        <colname> DBTYPE$_{13}$ <type>[(<size> | nolimit>) | (<rowstart for rid>)] [pk] [nullable]

```
[, <column def>]
[, pk(<colname>,<colname>)]
);
```
creates a table definition. One or more columns may be marked as the primary key ('pk'), whose function is described later.

```
create [unique | pk] [hash | sorted | clustered] [transient]
    index <Name> on <Name> (<column> [,<column>]) [,
    minrows=%d]
    [, buckets=%d] [, maxcollision=%d]
    [, [ascending | descending]];
```
creates a new index definition on an existing table.

```
extend table <sid>. <Name>
(
    <colname> DBTYPE_<<type>[(<size>)] nullable
    [, <column def>]
);
```
extends the definition of an existing table by adding a new column.

```
header (on);
...
header (off);
```
places all statements between the "header (on)" and "header (off)" tags directly into the structs header file described later.

A compiler 220 translates definition script file 210 into three different kinds of files 230 representing the schema. A standalone binary (.clb) schema file 231 contains a compiled version of the schema data that can be referenced directly. (This file is needed only to provide schema definitions and data to applications that did not have access to file 232, below, when that file was compiled.) It can be installed on a user's computer separately from any other program, in a location where the database engine can find it.

A binary schema file 232 is a C-language header file that contains the same schema data as file 231, a set of well-named data structures with initial data. The format of a data values is a binary dump of the compiled schema. A C compiler translates this source code into compiled data that can be included in a user's application program.

A developer can include this file as data in an application program so that the schema is hard-coded into the application. Although forfeiting flexibility, this approach provides very fast access to the data in the database. A helper file 233 contains definitions of the database tables in the schema in the form of C-language structures (structs). A set of macros in file 233 identify the tables numerically, and another set of macros identify table columns numerically. Some of these values can then be used in conjunction with conventional APIs for manipulating databases more directly through database engine 330. For example, for the employee table defined above, file 233 would contain a typedef for a C structure having a member for empid, FirstName, LastName, and dateofbirth. Then an API in engine 330 called GetStruct can uncompress and retrieve the data for an employee into an instance of that structure, because engine 330 knows exactly how that structure was laid out by the schema compiler.

Figure 3:
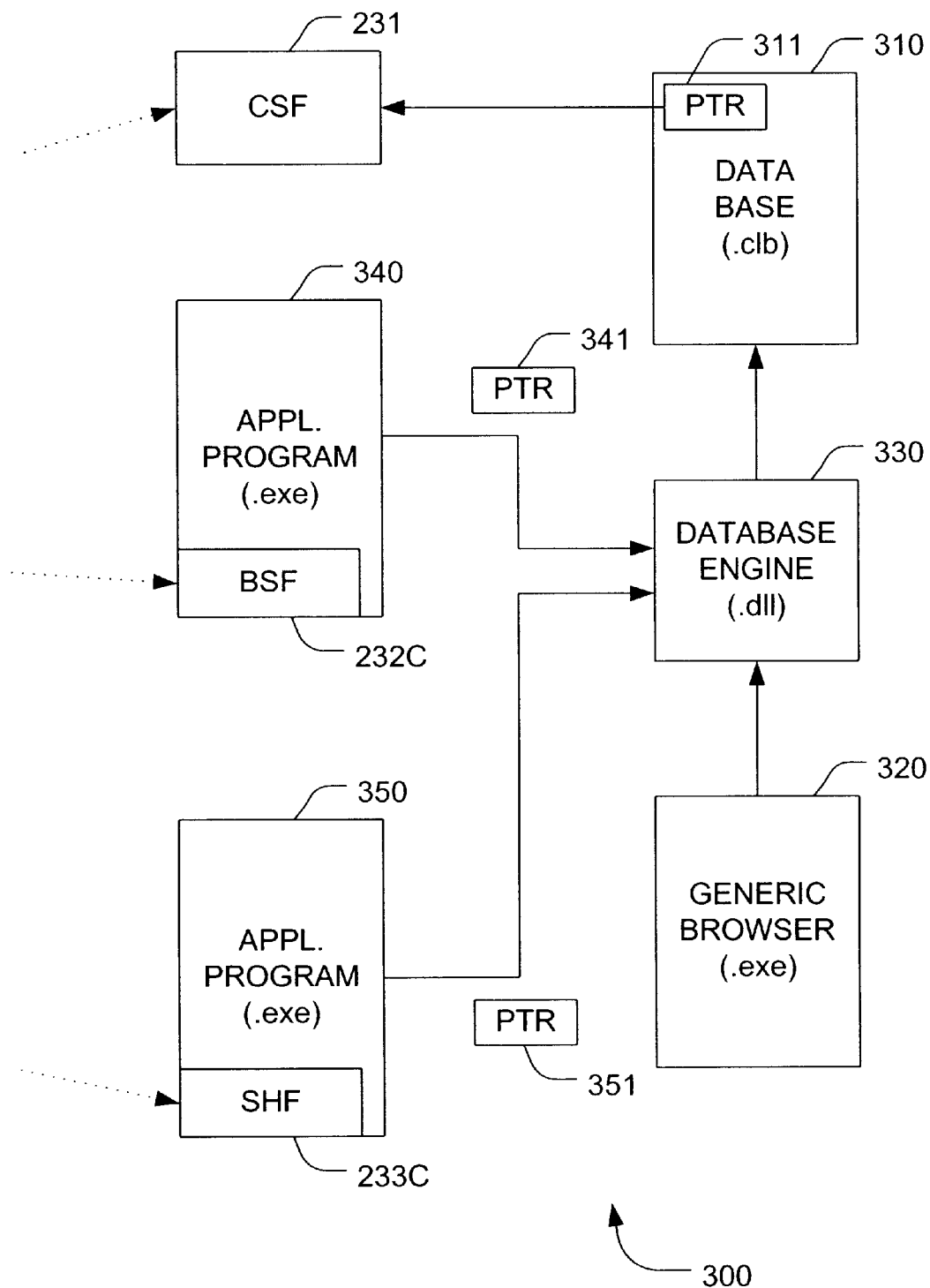
FIG. 3 is a diagram of components for processing databases.

FIG. 3 illustrates data and program components 300 for manipulating databases having an external pluggable schema. Although these components might be located on the same computer as components 200, the normal situation is that a large number of users each have their own copies of components 300 on different computers. The following description concerns the components of a single user. File 310 contains data for one instance of a database having one or more plugged-in schemata. The schema of each user's database is the same, but the actual data usually differs for each user.

Database engine 330 accesses the contents of the data in file 310, employing a schema description to decipher the layout of the data in the file. Engine 330 is shown as a dynamic link library (.dll) file; it could, however, be realized as any form of executable. Its functions are conventional, except that it can access an external schema file via a pointer, rather than using only an schema stored internally to a database. It can be optimized in conventional ways for small, single-user, read-mostly databases. For example, it need not allow concurrent writes by multiple users, and it might rewrite an entire table for every record that is newly inserted.

The schema description takes one of three forms:
(a) A binary version of the schema stored inside the database file, as in conventional practice.
(b) A pointer to the schema as compiled into a user's application program; (c) The file 231 copied to the user's machine and stored in a known location external to the database file itself.

Many of the uses for the invention incorporate schema files 232C and 233C into an application program, case (b) above. These files result from placing files 232 and 233, FIG. 2, into the source code of programs 340 and 350, and then compiling the programs.

A client application program such as 340 may perform any desired overall function. Program 340 contains a compiled version of the schema, 232C, stored as data in the program. When this client opens or creates the database, it calls database engine 330 and sends a pointer 341 to this data. The program can thereafter call other APIs on the database engine to work with tables and records of database 310. The advantage of giving the direct pointer to this data, instead of looking up a separate file 231, is performance; finding a separate file takes time, and it might not even be present if the developer had chosen not to make it public. Client application 340 must add the schema every time it opens the database, allowing engine 330 to access the schema definition and read the database data 310 correctly. Again, the engine itself is not aware of the schema of the database, and the schema need not be stored with the data.

Application program 350 utilizes the schema helper source code found in file 233. These schema helpers are source-code macros. The compiler that translates the program converts their usages into constant values and structure layouts. Certain conventional APIs in engine 330 can employ them to perform fast operations such as reading and writing data. All application program must have access to a file 231 or 232 (or to a conventional embedded schema in the database file itself). Use of a file 233 is orthogonal to this choice; although file 233 is normally employed in conjunction with a file of type 232.

Where numerous different databases 310 reside on the same computer, a generic browser program 320 allows a user to invoke database engine 330 to query and modify data on any of the databases. Although it can access any schema installed in the database itself, a system according to the invention need not have an internal schema. To provide for this case, case (c) above, database 310 includes a pointer 311 to standalone schema file 231 for that database. The first 16 bytes of the pointer contain a standard globally unique identifier (GUID) for the particular schema file 231. This requires that the schema files 231 for all databases 310 on the computer be accessible to the computer; they can be stored in a local catalog if desired. Although the generic browsing capability requires storing a small pointer 311 to the schema in the database, it avoids the overhead of storing the very much larger schema itself in the database. In some cases, it might be desired to make a database opaque to all but authorized browsers; merely eliminating the file 231 for such a database then prohibits generic browsers from accessing the data.

Browser 320 illustrates the case of an application program that has no internal schema representation, neither a file 232C nor a helper file 233C. That is, any application program can access a database 310, even without storing its schema internally in the application, by means of a standalone schema file 231. Browsers are not the only applications in which files 231 are advantageous.

Again, FIG. 3 depicts components 300 on the computer of a single user. Such a user may have many different data files 310, each having its own organization, and thus its own schema file 231. Different application programs such as 340 and 350 can operate upon different data files 310, and thus multiple programs on the same user machine can include different schema files 232. Multiple users can have any combination of the above configurations. Furthermore, for a purpose such as a component library, an address book, and many others, different users will commonly have database files 310 containing different data, all of which employ the same schema files 231 or 232.

Figure 4:
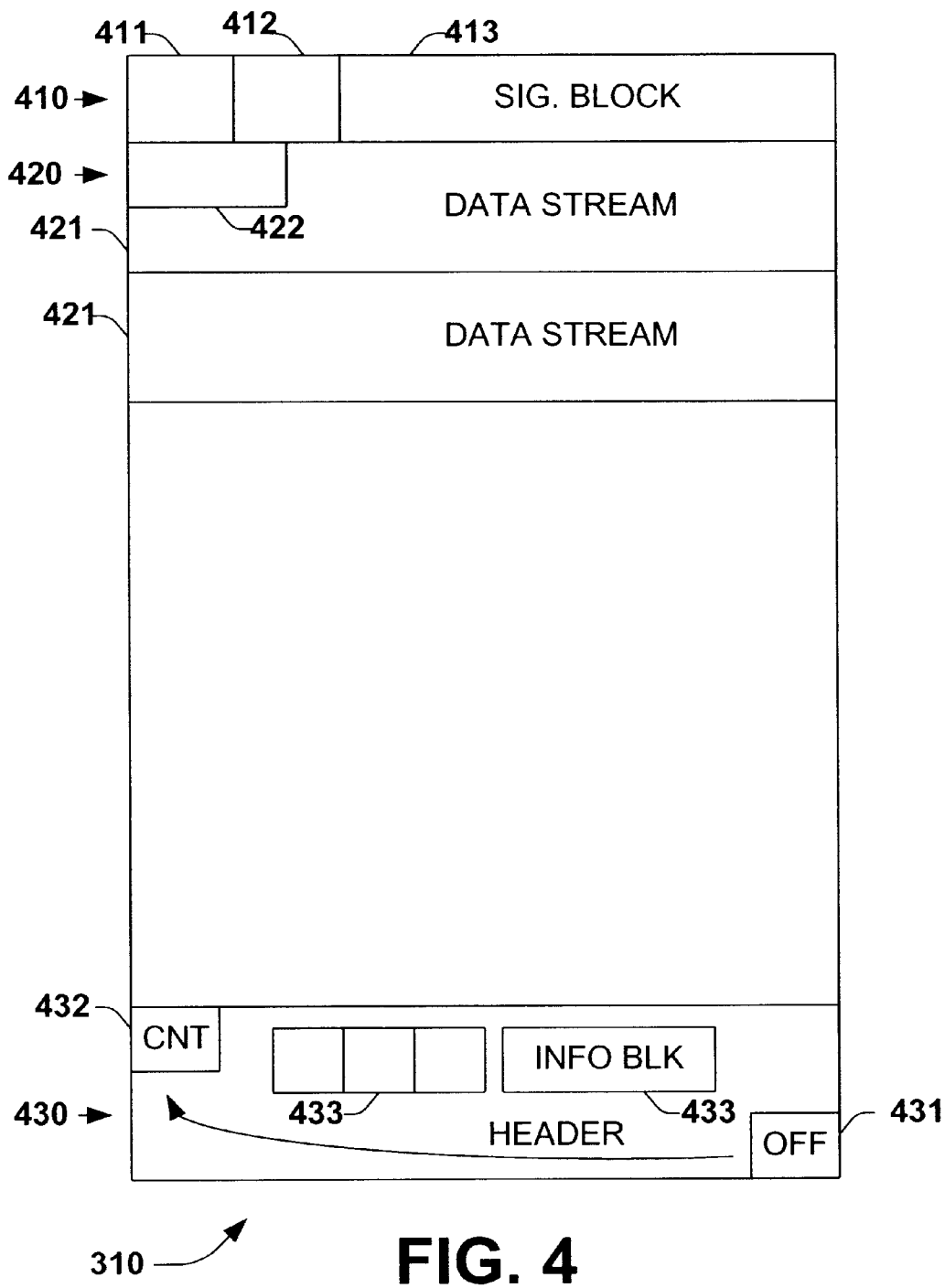
FIG. 4 is a diagram of a database data-file format according to the invention.

FIG. 4 shows an overall format of a file 310 for holding relational data organized as tables and columns in a database. A signature portion 410 holds identifying information. The first four bytes 411 identify the file as a conventional "COM+" type of file defined for the Component Object Model standard. Major and minor version numbers 412 follow, then any other identifying information 413. Multiple streams of data 420 follow the signature portion. A header portion 430 at the end of the file ends with an offset value 431 that contains the byte offset of the beginning of the header from the beginning of file 310. Placing the header at the end of the file allows the data in streams 420 to be serialized without having to seek backwards. Header 430 also contains a count 432 of the number of streams. An information block 433 for each stream contains the name of the stream, its size, and its offset within file 310.

The data within each stream 421 includes arrays of table data, strings, GUIDs, and other information. The layout of stream header 422 depends upon the content of the stream. For table data, header 422 contains the size of each record, how many records, are there, and the count of persisted indexes that come after the records; for a heap, it contains the counts and sizes of the heap data which might include strings, blobs, GUIDs, or VARIANTs (defined by the COM standard) followed by the compressed data. Other information could also be included if desired. Stream data within each type is compressed. Heaped data, such as strings, blobs (arbitrary user-defined arrays), GUIDs, and VARIANTs defined by COM, are represented by offsets or indexes into the heap, so that duplicate data values are effectively eliminated. Heaped data is inspected for length; if, for example, a data item is defined with a four-byte length, but the actual current data values require only two bytes, then the appropriate length values are modified; the dame technique could be applied to intrinsic data such as short/long integers, if desired.

Relational databases employ a number of data types, such as string, long and short integers, floating-point, and so forth. File 310 employs two additional data types. An object identifier (OID) has unique values across any one database file 310, and has a variable length, so that its length need be only enough to represent the values actually required in a particular database. OIDs can be used in any internal reference to a table or other object. A record identifier (RID) is an index number indicating the location of each record or row in a table. Although records in a true relational database form an unordered set (although a separate index can be defined for them), using a strictly internal ordering provides several benefits. The RID is never stored; it can be fetched by user code, and subsequently used to get a pointer back to that record. The COM+ standard employs this technique to identify metadata functions and classes in an actual byte code stream. The offsets, indexes, and pointers described herein perform substantially the same function, so that these terms can be considered equivalent to each other.

Figure 5:
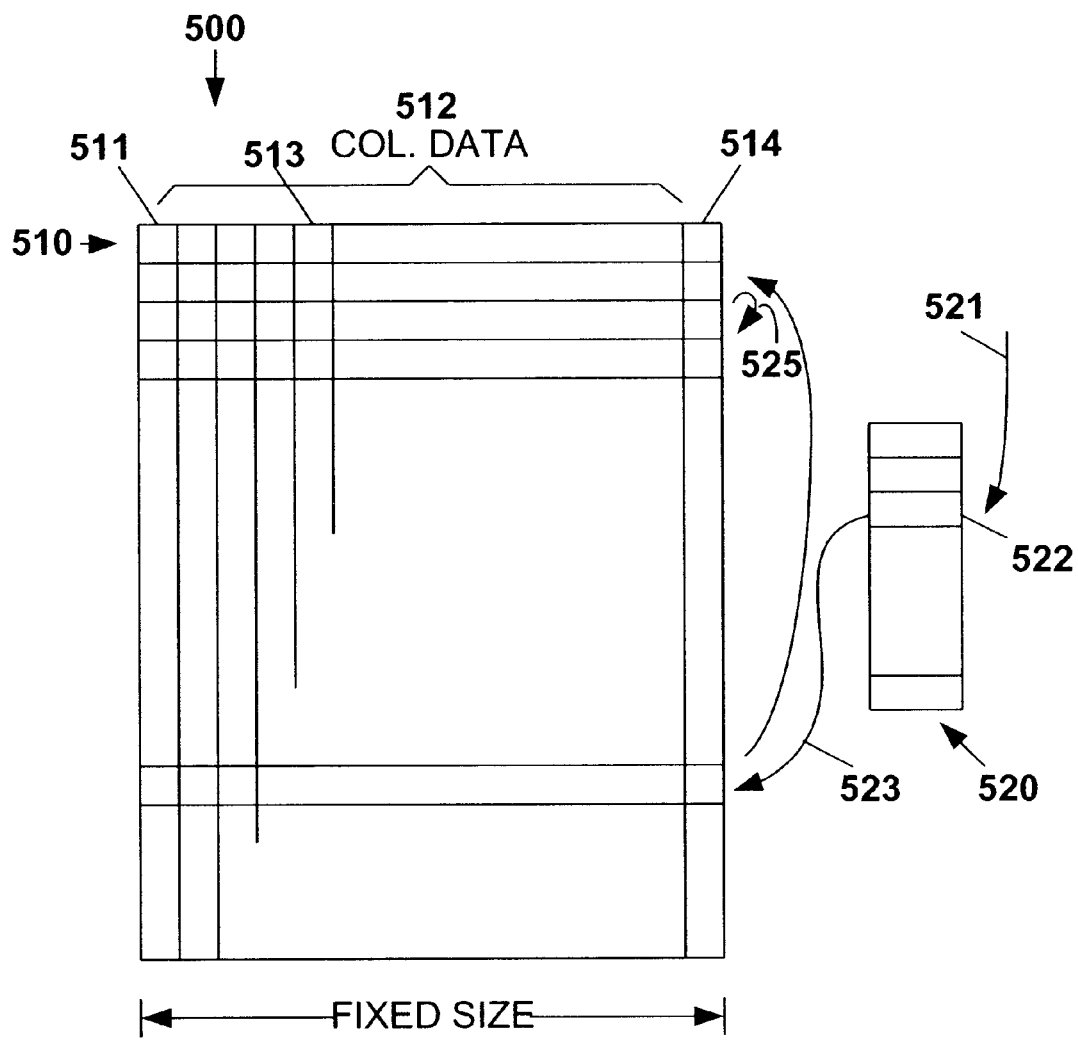
FIG. 5 shows a relational table format in the file of FIG. 4.

FIG. 5 shows a representative relational table 500 stored in file 310. Each record 510 has a fixed size, so that any record can be accessed by multiplying its sequential RID 511 by the fixed size. Although the fixed size and the sequential record numbers aspects of the format require rewriting the table when data values exceed a certain size, and even when the record order changes, the present invention optimizes the format for small databases under conditions where only single-user access is allowed, and where the proportion of writes is much less than the number of reads on database records. Therefore, tables are rewritten after every write to a record without incurring a significant performance penalty, and at the same time increasing the performance penalty, and at the same time increasing the performance for read accesses.

Column data are stored in cells 512 for each record. Many relational databases, especially small ones, are accessed most often by values in one or a few columns, called a primary key. If a primary key such as 513 is designated for a table 500, records are reordered so as to place them in order by the primary-key value, and RID values are adjusted accordingly. In this way, search engine 330 or another application program can locate a desired primary-key value with a simple and fast binary search, rather than resorting to a list search. Moreover, this allows size reduction by eliminating an extra set of index data to find records. Although it might be advantageous to rewrite the table after every data update, this embodiment physically reorders the table records upon a save or transaction commit. Subsequent read-only accesses can then merely binary-search the data values to find the desired record.

A search engine or other application also can use a hash search to access a particular record. Conventional hash structures provide a separately stored table of hash buckets, each bucket having a chain of cells pointing to successive data locations for colliding data, i.e., those that hash to the same value. Table 500 provides an additional column 514 for each record in order to decrease the size of the hash mechanism. A conventional vector of hash buckets 520 receives a hash value 521 when the search engine hashes data received from the application. Instead of accessing separate chains, the contents of the accessed bucket 522 points to one of the records that matches the hash value, as indicated at line 523. If the requested column data matches the value requested, then the search is over and that record is returned. If the data do not match, the next record is accessed. That record is identified by placing its RID 511 in the hash column for the first record in the chain. The application then accesses that record and compares its column data with the desired value. If that comparison does not succeed, arrow 525 points to the next record, and so on. The end of a chain is indicated by placing a predetermined value, such as −1, in its hash column 514.

Other features and advantages of the invention, as well as variations within the scope of the invention, will be readily apparent to those skilled in the art.

What is claimed is:

1. A table format for representing column data for a relational database in a data file, comprising:

a plurality of records of fixed size;

a record identification number associated with each record, the plurality of records being ordered sequentially based on respective record identification numbers, such that a record is accessible by multiplying the respective record identification number by the fixed size; and a plurality of columns in each record for holding the column data values, the table being rewritten after changes to any of its column data values.

2. A table format according to claim 1, wherein the size of each column is no larger than necessary to hold the largest column data value in all of the records.

3. A table format according to claim 2, at least one of the columns being designated a primary key, the records being arranged in order of the data values of their primary key columns and the record identification values being adjusted based on the order of the record in the plurality of records.

4. A table format according to claim 3, further comprising a non-data hash column in each record, the value in each hash column designating another record in the table that holds column data that hashes to the same hash value.

5. A table format according to claim 4, the records in the table being searchable by any of the value in the non-data hash column, the primary key value and the record identification number.

6. A table format according to claim 4, further comprising a hash vector having a plurality of cells each holding the number of only one of the records that hashes to any particular value.

7. A table format according to claim 4, further comprising a non-data record-number column for holding the record identification number the values in the hash-column being taken from the record identification number in the record-number column.

8. A table format according to claim 1, the table being rewritten when at least one column data value exceeds a certain size.

9. A table format according to claim 1, the table being rewritten when records are reordered.

10. A table format according to claim 1, the records being physically reordered upon a save or transaction commit, such that subsequent read-only accesses can then binary-search the data values to find a desired record.

11. A table format according to claim 1, the table format being optimized for small databases under conditions where single user access is allowed and the proportion of writes being substantially less than the number of reads on the records.

12. A computer readable medium containing a table format for representing column data for a relational database in a data file, comprising:

a plurality of records of fixed size;

a record identification number associated with each record, the plurality of records being ordered sequentially based on respective record identification numbers, such that a record is accessible by multiplying the respective record identification number by the fixed size; and a plurality of columns in each record for holding the column data values, the table being rewritten after changes to any of its column data values.

* * * * *